US008527619B2

(12) United States Patent
Ewing et al.

(10) Patent No.: US 8,527,619 B2
(45) Date of Patent: *Sep. 3, 2013

(54) REMOTE POWER CONTROL SYSTEM WITH TICKLE CAPABILITY

(75) Inventors: Carrel W. Ewing, Reno, NV (US); Andrew J. Cleveland, Reno, NV (US)

(73) Assignee: Server Technology, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,538

(22) Filed: Dec. 8, 2010

(65) Prior Publication Data

US 2011/0197080 A1    Aug. 11, 2011

Related U.S. Application Data

(63) Continuation of application No. 11/738,417, filed on Apr. 20, 2007, now abandoned, which is a continuation of application No. 11/370,489, filed on Mar. 7, 2006, which is a continuation of application No. 09/732,557, filed on Dec. 8, 2000, now Pat. No. 7,099,934, which is a continuation-in-part of application No. 09/375,471, filed on Aug. 16, 1999, now Pat. No. 6,711,613.

(51) Int. Cl.
   *G06F 15/173*     (2006.01)
   *G06F 1/26*       (2006.01)

(52) U.S. Cl.
   USPC ............ 709/223; 713/310; 713/330; 713/340

(58) Field of Classification Search
   USPC ............... 709/217–228; 713/300, 310, 330, 713/340; 340/693.1; 307/34–38
   See application file for complete search history.

(56) References Cited

U.S. PATENT DOCUMENTS

| 4,729,375 | A  | 3/1988  | Jegers et al.         |
|-----------|----|---------|-----------------------|
| 4,777,607 | A  | 10/1988 | Maury et al.          |
| 4,814,941 | A  | 3/1989  | Speet et al.          |
| 5,424,903 | A  | 6/1995  | Schreiber             |
| 5,563,455 | A  | 10/1996 | Cheng                 |
| 5,650,771 | A  | 7/1997  | Lee                   |
| 5,949,974 | A  | 9/1999  | Ewing et al.          |
| 6,002,340 | A  | 12/1999 | Smith                 |
| 6,086,397 | A  | 7/2000  | Chapman et al.        |
| 6,181,027 | B1*| 1/2001  | Grady ............ 307/31 |

(Continued)

OTHER PUBLICATIONS

Interworking Labs Releases New, Extended SNMP Test Suite with Windows NT and Windows 95 Support, Interworking Labs, pp. 1-2, Jul. 15, 1996.

(Continued)

*Primary Examiner* — Haresh N Patel

(57) ABSTRACT

An SNMP network comprises a power manager with an SNMP agent in TCP/IP communication over a network with an SNMP network manager. The power manager is connected to control several intelligent power modules each able to independently control the power on/off status of several network appliances. Power-on and load sensors within each intelligent power module are able to report the power status of each network appliance to the SNMP network manager with MIB variables in response to GET commands. Each intelligent power module is equipped with an output that is connected to cause an interrupt signal to the network appliance being controlled. The SNMP network manager is able to test which network appliance is actually responding before any cycling of the power to the corresponding appliance is tried.

13 Claims, 4 Drawing Sheets

(56) References Cited

U.S. PATENT DOCUMENTS

| | | | |
|---|---|---|---|
| 6,266,713 B1 | 7/2001 | Karanam et al. | |
| 6,360,277 B1* | 3/2002 | Ruckley et al. | 709/250 |
| 6,476,729 B1 | 11/2002 | Liu | |
| 6,480,964 B1 | 11/2002 | Oh | |
| 6,557,170 B1 | 4/2003 | Wilder et al. | |
| 6,642,852 B2 | 11/2003 | Dresti et al. | |
| 6,711,163 B1 | 3/2004 | Reid et al. | |
| 6,711,613 B1* | 3/2004 | Ewing et al. | 709/223 |
| 6,741,442 B1* | 5/2004 | McNally et al. | 361/166 |
| 6,839,775 B1 | 1/2005 | Kao et al. | |
| 7,010,589 B2* | 3/2006 | Ewing et al. | 709/223 |
| 7,171,461 B2 | 1/2007 | Ewing et al. | |
| 7,171,542 B1 | 1/2007 | Alfano et al. | |
| 2002/0043960 A1 | 4/2002 | Janik | |
| 2002/0052940 A1 | 5/2002 | Myers et al. | |
| 2004/0039821 A1 | 2/2004 | Giglio et al. | |
| 2004/0057179 A1* | 3/2004 | Galang et al. | 361/90 |
| 2004/0221181 A1 | 11/2004 | Yu | |
| 2005/0203987 A1 | 9/2005 | Ewing et al. | |
| 2006/0031453 A1 | 2/2006 | Ewing et al. | |
| 2006/0031454 A1 | 2/2006 | Ewing et al. | |
| 2006/0072531 A1 | 4/2006 | Ewing et al. | |
| 2006/0143289 A1 | 6/2006 | Smith et al. | |
| 2006/0259538 A1 | 11/2006 | Ewing et al. | |
| 2007/0016664 A1 | 1/2007 | Ewing et al. | |
| 2007/0050443 A1 | 3/2007 | Ewing et al. | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |

OTHER PUBLICATIONS

2T-HA10F-CD 3.6 kVA Uninterruptible Power System: Operating information, Digital Equipment Corp., Order No. EK-HA10F-OP. B01, pp. 1-1 to 5-4, Aug. 1992.

A Software managing Clustered Multi-Vender Uninteruptible Power Supply on Network, IBM Tech. Disclosure Bulletin, vol. 42, No. 419, Mar. 1, 1999.

Touch-Pad Code-Actuated Electrical Outlet, IBM Tech. Disclosure Bulletin, vol. 33, No. 1A, 143-147, Jun. 1, 1990.

UPS MIB, Merling Gerin—DAM Division, www.exploits.org/nut/library/protocols/snmp/mgeups.mib, pp. 1-41, Oct. 11, 1995.

Liebert SiteNet SNMP MIBs, The Latest MIBs Available for Download, http://www.liebert.com/products/english/products/software/snmp/intro. asp?ID=921, pp. 1-2, Jul. 2, 2003.

Newman, J., Enterprise Power Protection: Don't Get UPSet; Get the Right UPS Instead, Network Computing, vol. 7, No. 2, pp. 1-10, Feb. 15, 1996.

"Expert Witness Report of Douglas Bors, PE" *Server Technology, Inc.* v. *American Power Conversion Corporation*, Case No. 3:06-CV-00698-LRH-VPC, 87 pp. (May 27, 2011).

"Expert Witness Report of Dr. Mark Horenstein Regarding Invalidity of STI's Patents" *Server Technology, Inc.* v. *American Power Conversion Corporation*, Case No. 3:06-CV-00698-LRH-VPC, 137 pp. (May 27, 2011).

"Expert Report of KC Mares" *Server Technology, Inc.* v. *American Power Conversion Corporation*, Case No. 3:06-CV-00698-LRH-VPC, 204 pp. (May 27, 2011).

"Rebuttal Expert Witness Report of Douglas Bors, PE" *Server Technology, Inc.* v. *American Power Conversion Corporation*, Case No. 3:06-CV-00698-LRH-VPC, 19 pp. (Jun. 29, 2011).

"Expert Report of B. Michael Aucoin, D. Engr., PE, PMP Consolidated Rebuttal of APC's Expert Invalidity Reports" *Server Technology, Inc.* v. *American Power Conversion Corporation*, Case No. 3:06-CV-00698-LRH-VPC, 152 pp. (Jun. 29, 2011).

"Expert Report of KC Mares (in Rebuttal to APC's Invalidity Reports)" *Server Technology, Inc.* v. *American Power Conversion Corporation*, Case No. 3:06-CV-00698-LRH-VPC, 33 pp. (Jun. 29, 2011).

"American Power Conversion Motion for Summary Judgment" *Server Technology, Inc.* v. *American Power Conversion Corporation*; Case No. 3:06-cv-00698-LRH-VPC; 4 pp.; Aug. 30, 2011.

"APC's Memorandum of Law in Support of Its Motion for Summary Judgment and Exhibits" *Server Technology, Inc.* v. *American Power Conversion Corporation*; Case No. 3:06-cv-00698-LRH-VPC; 75 pp.; Aug. 30, 2011.

"STI's Response to APC's Motion for Summary Judgment" *Server Technology, Inc.* v. *American Power Conversion Corporation*; Case No. 3:06-cv-00698-LRH-VPC; 85 pp.; Sep. 26, 2011.

"APC's Reply in Support of Summary Judgment and Exhibits" *Server Technology, Inc.* v. *American Power Conversion Corporation*; Case No. 3:06-cv-00698-LRH-VPC; 90 pp.; Oct. 14, 2011.

"Patent Owner's Revised Response to Non-Final Office Action, and Exhibits," Reexamination Control No. 95/001,485; 615 pp.; Jun. 20, 2011.

"Requestor's Revised Comments on Office Action of Jan. 15, 2011 and Patent Owner's Revised Response, and Exhibits," Reexamination Control No. 95/001,485; 380 pp.; Sep. 29, 2011.

Betty Yuan, "Remote Control Equals Power," Teleconnect, Feb. 2000, pp. 60-66, New York, NY USA.

Office Action dated Jun. 10, 2010; U.S. Appl. No. 11/125,963; USPTO.

Office Action dated Dec. 19, 2011; U.S. Appl. No. 11/243,823; USPTO.

Office Action dated Oct. 13, 2011; U.S. Appl. No. 11/459,011; USPTO.

Office Action dated Oct. 13, 2011; U.S. Appl. No. 11/548,187; USPTO.

Office Action dated Jun. 8, 2010; U.S. Appl. No. 11/738,417; USPTO.

Office Action dated Nov. 28, 2011; U.S. Appl. No. 12/853,193; USPTO.

Office Action dated Dec. 22, 2011; U.S. Appl. No. 11/126,092; USPTO.

Office Action dated May 3, 2012; U.S. Appl. No. 13/214,050; USPTO; 12 pp.

Office ActOffice Action dated Mar. 13, 2012; U.S. Appl. No. 13/091,082; USPTO; 47 pp.

Office Action dated Mar. 16, 2012; U.S. Appl. No. 12/963,538; USPTO; 50 pp.

Office Action dated Jul. 6, 2012; U.S. Appl. No. 11/243,823; USPTO; 31 pp.

Office Action dated Apr. 18, 2012; U.S. Appl. No. 11/126,092; USPTO; 28 pp.

Office Action dated Jun. 22, 2012; U.S. Appl. No. 12/853,193; USPTO; 11 pp.

American Power Conversion Corporation; Masterswitch VM Power Distribution Unit User Guide; 1999; 51 pp.

American Power Conversion Corporation; MasterSwitch VM Power Distribution Unit Installation and Quick Start Manual; 2000; 20 pp.

American Power Conversion Corporation; PowerNet SNMP Management Information Base (MIB) v3.1.0 Reference Guide; 1999; 48 pp.

Bay Technical Associates, Inc.; download of www.BayTech.net from web.archive.org; 1997; 8 pp.

Bay Technical Associates, Inc.; Owner's Manual for BayTech Remote Power Control Unit for Models RPC-2, RPC-2A, RPC-2 MD01, RPC3-15 Amp, RPC3-20 Amp, RPC-3A, RPC-4, RPC-5, RPC-7, RPC-21; Jan. 2000; 80 pp.

M2 Communications Ltd. M2 Presswire; BayTech's vertically mounted power strip helps network managers keep equipment up and running; Nov. 19, 1999; 1 p.

Systems Enhancement Corporation; Power Administrator 800: User's Manual; 1996; 50 pp.

Office Action dated Jan. 31, 2011; U.S. Appl. No. 11/548,201; USPTO; 30 pp.

Office Action dated Mar. 29, 2012; Reexamination Control No. 95/001,485; USPTO; 103 pp.

Server Technology, Inc.; "Patent Owner's Response to Non-Final Office Action"; Reexamination Control No. 95/001,485; May 29, 2012; 56 pp.

Carrel W. Ewing; "Second Declaration of Carrel W. Ewing Under 37 CFR §1.132"; Reexamination Control No. 95/001,485; May 29, 2012; 140 pp.

Michael B. Aucoin; "Second Declaration of B. Michael Aucoin Under 37 CFR 1.132"; Reexamination Control No. 95/001,485; May 29, 2012; 58 pp.

Chris Hardin; "Second Declaration of Chris Hardin Under 37 CFR 1.132"; Reexamination Control No. 95/001,485; May 29, 2012; 9 pp.

KC Mares; "Second Declaration of KC Mares Under 37 CFR 1.132"; Reexamination Control No. 95/001,485; May 29, 2012; 5 pp.

Michael R. Henson; "Declaration of Michael R. Henson Under 37 CFR §1.132"; Reexamination Control No. 95/001,485; May 29, 2012; 30 pp.

American Power Conversion Corporation; "Notice of Second Office Action in Reexamination Proceedings," *Server Technology, Inc. v. American Power Conversion Corporation*; Case No. 3:06-CV-00698-LRH-VPC; Apr. 10, 2012; 87 pp.

Server Technology, Inc.; "STI's Response to APC's Notice of Second Office Action in Reexamination Proceedings," *Server Technology, Inc. v. American Power Conversion Corporation*; Case No. 3:06-CV-00698-LRH-VPC; Apr. 18, 2012; 5 pp.

Pinherio et al.; "Load Balancing and Unbalancing for Power and Performance in Cluster-Based Systems"; May 2001; Department of Computer Science; Rutgers University; Technical Report DCT-TR-440; 11 pp.

Office Action dated Feb. 15, 2013; U.S. Appl. No. 13/290,944; USPTO; 16 pp.

Office Action dated Feb. 19, 2013; U.S. Appl. No. 12/853,193; USPTO; 23 pp.

Office Action dated Feb. 12, 2013; U.S. Appl. No. 13/195,836; USPTO; 22 pp.

Office Action dated Sep. 21, 2013; U.S. Appl. No. 12/965,563; USPTO; 26 pp.

\* cited by examiner

REMOTE POWER CONTROL SYSTEM WITH TICKLE CAPABILITY

CROSS-REFERENCE TO PRIOR APPLICATIONS

This Application is a continuation of U.S. patent application Ser. No. 11/738,417, filed on Apr. 20, 2007, now abandoned, which is a continuation of U.S. patent application Ser. No. 11/370,489, filed on Mar. 7, 2006, now copending, which is a continuation of U.S. patent application Ser. No. 09/732,557, filed on Dec. 8, 2000 and issued as U.S. Pat. No. 7,099,934 on Aug. 29, 2006, which is a continuation-in-part of U.S. patent application Ser. No. 09/375,471, filed on Aug. 16, 1999 and issued as U.S. Pat. No. 6,711,613 on Mar. 23, 2004. The contents of all the listed prior applications are incorporated herein by reference.

This application also incorporates by reference U.S. patent application Ser. No. 10/758,117, filed on Jan. 16, 2004 and issued at U.S. Pat. No. 7,010,589 on Mar. 7, 2006; U.S. patent application Ser. No. 10/806,130, filed on Mar. 23, 2004 and issued as U.S. Pat. No. 7,162,521 on Jan. 9, 2007; and U.S. patent application Ser. No. 08/685,436, filed on Jul. 23, 1996 and issued as U.S. Pat. No. 5,949,974 on Sep. 7, 1999.

BACKGROUND

1. Field

The technical field relates generally to automatic power control and more particularly to remote control methods and devices to maintain computer network system availability.

2. Description of the Prior Art

Enterprise networks exist to support large world-wide organizations and depend on a combination of technologies, e.g., data communications, inter-networking equipment (frame relay controllers, asynchronous transfer mode (ATM) switches, routers, integrated services digital network (ISDN) controllers, application servers), and network management application software. Such enterprise networks can be used to support a large company's branch offices throughout the world, and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and the United States that each critically depend on their ability to communicate banking transactions quickly and efficiently with one another and headquarters.

A typical enterprise network uses building blocks of router and frame relay network appliances mounted in equipment racks. Such equipment racks are distributed to remote point of presence (POP) locations in the particular network. Each equipment rack can include frame relay controllers, routers, ISDN controllers, servers and modems, etc., each of which are connected to one or more power sources. The value of POP equipment can range from $200,000 to $500,000, and the number of individual devices can exceed a thousand.

Many enterprises rely on an uninterruptible power supply (UPS) to keep their network appliances operational. Many network appliances are typically connected to a single UPS, and this sets up a problem. When an individual router locks up, the router's power cannot be individually cycled on and off externally at the UPS because it is connected to a multiple power outlet. The recovery action choices available to the network control center operator thus do not include being able to reinitialize the individual equipment through a power interruption reset. The network operator could command the UPS to power cycle, but that would reset all the other attached devices that were ostensibly operating normally and carry other network traffic. Another option is to dispatch someone to the remote location to reset the locked-up device. Neither choice is an attractive solution.

In large organizations that have come to depend heavily on enterprise networks, great pressures develop to control costs and thus to improve profits. Organizational down-sizing has been used throughout the corporate world to reduce non-network costs, and that usually translates to fewer technical people available in the right places to support large and complex in-house global networks. Such reduced repair staffs now rely on a combination of centralized network management tools and third-part maintenance organizations to service their remote POP sites. The Costs associated with dispatching third-party maintenance technicians is very high, and the dispatch and travel delay times can humble the business operations over a wide area for what seems an eternity.

Global communication network operators, located at a few centralized network management centers, are relying more and more automated network management applications to analyze, process, display and support their networks. An increasing number of network management software applications are being marketed that use open-system standardized protocols. Particular network application tool software is available to report lists of the network appliances, by location, and can issue trouble lists and keep track of software versions and releases. New simple network management protocol (SNMP) applications are conventionally used to issue alarms to central management consoles when remote network appliances fail.

One such SNMP network management application is marketed by Hewlett-Packard. HP OPENVIEW is a family of network and system management tools and services for local and wide area multivendor networks. OPENVIEW is a management platform that provides application developers and users with the ability to manage multivendor networks and expand their distributed computing environments. OPENVIEW allows network operation centers to build an intelligent hierarchical network management application, and uses open standards such as SNMP, user datagram protocol (UDO), and the noew ubiquitous transmission control protocol/internet protocol (TCP/IP). Because OPENVIEW is build on open system standards, global communication network operators can easily integrate the various inter-networking equipment nodes into a managed environment operated by strategically located network consoles.

In order to provide a reliable computing environment, a robust and active process for problem resolution must be in place. OPENVIEW allows the definition of thresholds and monitoring intervals, and the interception of network, system, database, and application-messages and alerts. Once a threshold value is exceeded, intelligent agents can run a pre-defined automatic action and/or generate and send a message to alert an operator on a central management console. Messages can also be forwarded to a pager or trouble-ticketing application. To help focus on the most critical problems, a message browser window is used to display six severity levels for incoming problems and events, e.g., ranging from stable to critical. An integrated history database is provided for auditing and analyzing system and network activities, for identifying trends and for anticipating problems before they occur. Activity displays and reports can be customized by the users.

Prior art SNMP network management uses embedded microprocessors in almost every network appliance to support two-way inter-computer communications with TCP/IP, of which SNMP is a member of the TCP/IP protocol. SNMP is conventionally used to send messages between management client nodes and agent nodes. Management information blocks (MIBs) are used for statistic counters, port status, and other information about routers and other network devices. GET and SET commands are issued from management consoles and operate on particular MIB variable for the equipment nodes. Such commands allow network management functions to be carried out between client equipment nodes and management agent nodes.

SNMP is an application protocol for network management services in the internet protocol suite. SNMP has been adopted by numerous network equipment vendors as their main or secondary management interface. SNMP defines a client/server relationship, wherein the client program, a "network manager", makes virtual connections to a server program, an "SNMP agent", on a remote network device. The data base controlled by the SNMP agent is the SNMP management information base, and is a standard set of statistical and control values. SNMP and private MIBs allow the extension of standard values with values specific to a particular agent. Directives issued by the network manager client to an SNMP agent comprise SNMP variable identifiers, e.g., MIB object identifiers or MIB variables, and instructions to either GET the value for the identifier, or SET the identifier to a new value. Thus private MIB variables allow SNMP agents to be customized for specific devices, e.g., network bridges, gateways, and routers. The definitions of MIB variables being supported by particular agents are located in descriptor files, typically written in abstract syntax notation (ASN.1) format. The definitions are available to network management client programs.

SNMP enjoys widespread popularity, and SNMP agents are available for network devices including computers, bridges, modems, and printers. Such universal support promotes interoperability. The SNMP management protocol is flexible and extensible, SNMP agents can incorporate device specific data. Mechanisms such as ASN.1 files allow the upgrading of network management client programs to interface with special agent capabilities. Thus SNMP can take on numerous jobs specific to device classes such as printers, routers, and bridges. A standard mechanism of network control and monitoring is thus possible.

Unfortunately, SNMP is a complicated protocol to implement, due to complex encoding rules, and it is not a particularly efficient protocol. Bandwidth is often wasted with needless information, such as the SNMP version that is to be transmitted in every SNMP message, and multiple length and data descriptors scattered throughout each message. SNMP variables are identified as byte strings, where each byte corresponds to a particular node in the MIB database. Such identification leads to needlessly large data handles that can consume substantial parts of each SNMP message.

Most vendors implement network managers thinking a user's primary interest is in the data associated with particular network devices. But such data is easily acquired by other means, e.g., "netstat" and "rsh" UNIX programs. The important information about the network includes the differences between devices, besides their current states. SNMP affords good mechanism for rapidly processing such differences on large networks, since SNMP avoids the processing burden of remote login and execution.

Network management applications can thus monitor the health of every part of a global communications network and can be set to communicate alarms to a central management console. Current network management applications do an adequate job of informing central management consoles about the health of various nodes in the network and the alarms they issue when a node is failing are useful.

Conventional SNMP network management technologies do not provide sufficient information related to the nodes' electrical power status. A new technology is needed that can be simply and inexpensively added to client equipment nodes for SNMP reporting of the electrical power status of the node. For example, in a router based network with SNMP support, prior art individual routers can use SNMP to issue an alarm to the management console. But the console operator would know only that the router is failing. A GET command can be issued to the router node to determine if the counter and buffer threshold limits were exceeded and caused a router to lockup. However, the console operator does not have any information about the electrical power status to the router, e.g., has the router power switch been moved to the OFF position or has the switch been accidentally turned OFF? The electrical power source could have failed the power cable connection become loose, or a technician may have accidentally removed the router from a rack.

SUMMARY

Certain embodiments of the present invention provide a system and method for providing power supply status and control in network nodes at geographically distant locations.

Certain embodiments of the present invention provide a system and method for describing power supply status and control in SNMP MIB variable between network nodes and a central network management console.

Certain embodiments of the present invention provide a verification of which particular network appliance will be subjected to a power-up or power-down command before the operator must commit to such commands.

Briefly, an SNMP network embodiment of the present invention can comprise a power manager with an SNMP agent in TCP/IP communication over a network with an SNMP network manager. The power manager can be connected to control several intelligent power modules each able to independently control the power on/off status of several network appliances in an equipment rack at a common remote node, e.g., a point-of-presence site. Power-on and load sensors within each intelligent power module can report the power status of each network appliance to the SNMP network manager with MIB variable in response to GET commands. Each intelligent power module can be equipped with an output that is connected to cause an interrupt signal to the network appliance being controlled. The SNMP network manager can test which network appliance is actually responding before any cycling of the power to the corresponding appliance is tried.

An advantage of certain embodiments of the present invention is that a system and method can be provided that can help an operator avoid the mistake of turning on or off the wrong network appliance in a busy equipment rack at a remote site.

Another advantage of certain embodiments of the present invention is that a system and method can be provided for describing power supply status and control in SNMP MIB variables between network nodes and a central network management console.

A further advantage of certain embodiments of the present invention is that a system and method can be provided that allows a network console operator to investigate the functionality of the electrical power status when a router or other network device has been detected as failing.

A still further advantage of certain embodiments of the present invention is that a system and method can be provided for reducing the need for enterprise network operators to dispatch third party maintenance vendors to remote equipment rooms and POP locations simply to power-cycle failed network appliances. The costs to dispatch such third party maintenance vendor can run from $300-$600 per call. The cost of implementing the present invention can be recaptured in less than one year, e.g., by reducing the number of third party maintenance dispatches to remote locations.

Another advantage of certain embodiments of the present invention is that a system and method can be provided for reducing the time it takes to restore a failed network appliance and improving service level measures.

Another advantage of certain embodiments of the present invention is that a system and method can be provided for reducing organization losses from network downtime. Being able to immediately power-cycle a failed server and thus return the server to operation can directly reduce the downtime loss to the organization.

There are other objects and advantages of various embodiments of the present invention. They will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
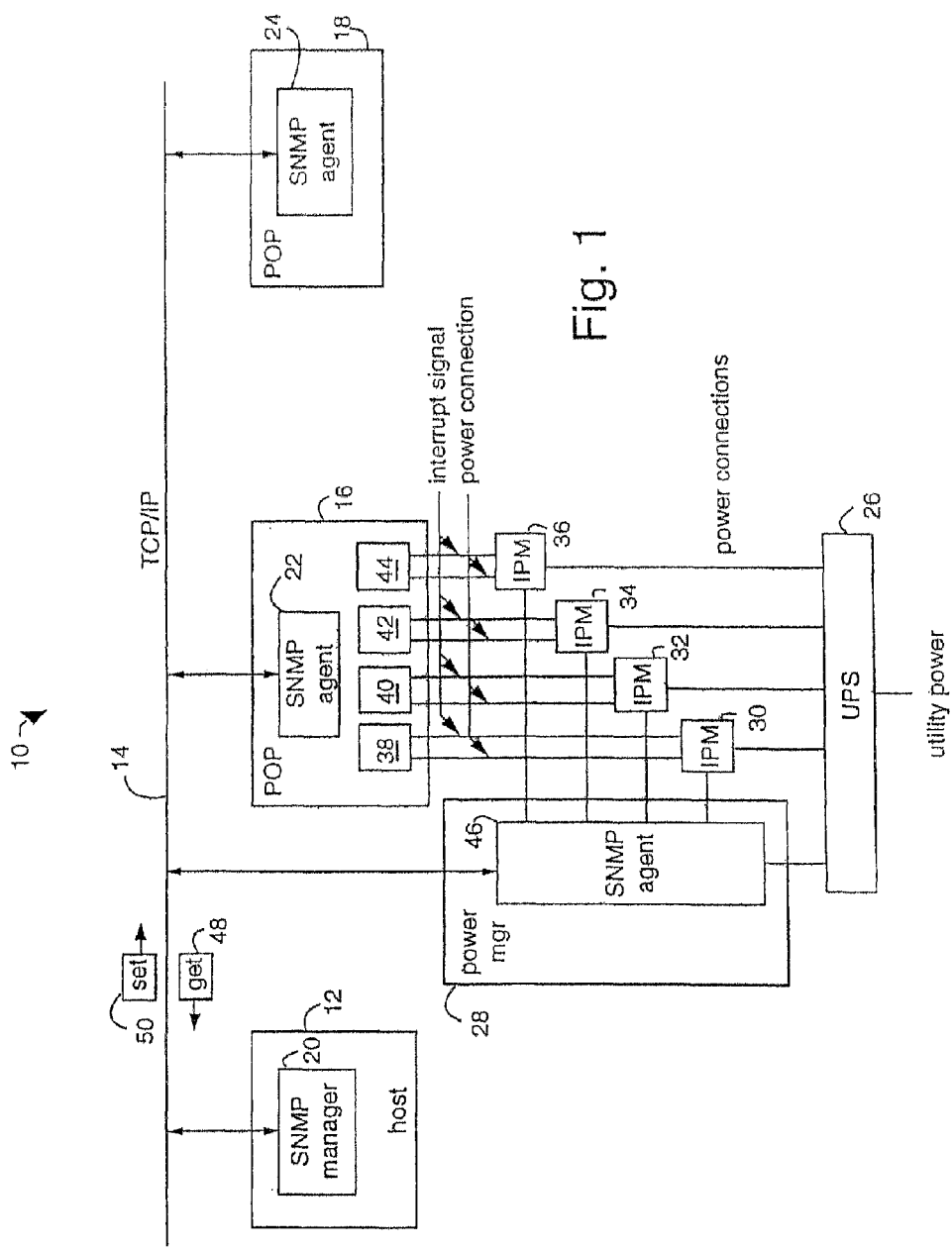
FIG. 1 is a block diagram of a simple network management protocol (SNMP) network embodiment of the present invention.

FIG. 1 illustrates a simple network management protocol (SNMP) network embodiment of the present invention, referred to herein by the general reference numeral 10. The SNMP network 10 includes a host 12 with a TCP/IP connection 14 to a plurality of point-of-presence (POP) nodes represented by a pair of network equipment racks 16 and 18. SNMP network management is provided by a SNMP manager 20 in communication with a respective pair of SNMP agents 22 and 24 at the remote nodes. The SNMP manager 20 may comprise a commercial product such as IBM NETVIEW/6000, HP OPENVIEW, POLYCENTER, SunNet MANAGER, Cabletron SPECTRUM, etc.

An uninterruptible power supply (UPS) 26 provides operating power to a TCP/IP-addressable enterprise power manager 28. It also powers a plurality of intelligent power modules (IPM's) 30, 32, 34, 36 that are able to switch the operating power on/off to a corresponding network appliances 38, 40, 42, 44.

An SNMP agent 46 is private to the power manager 28. It does not depend on the equipment rack 16 or any of its network appliances 38, 40, 42, 44. The power manager 28 is connected to independently control each of the intelligent power modules 30, 32, 34, 36. Such control includes being able to sense the power-on and load status of each of the network appliances 38, 40, 42, 44 and to switch power on and off to each of the network appliances 38, 40, 42, 44. Such status is sensed and reported by an SNMP GET command 48 and the power switching is accomplished with an SNMP SET command 50 that issue from the host 12.

The power manager 28 and IPM's 30, 32, 34, 36, are also able to generate an interrupt signal to each corresponding network appliances 38, 40, 42, 44. Although FIG. 1 shows only the four network appliances 38, 40, 42, 44, typical installations will have so many that it is easy for the wiring of the power supply to get confused. In practice this has happened often enough that serious consequences have been paid when the network appliance that was supposed to be controlled by a particular IPM was not. Given the dependence that customers, users, and suppliers now place on the uninterrupted operation of their networks, accidental interruptions cannot be tolerated at all.

If the SNMP manager 20 intends, for example, to power cycle the third network appliance 42, an interrupt signal is sent to IPM 34 via SNMP agent 46. If IPM 34 really is supplying the power to network appliance 42, an interrupt signal will be processed and a message will be sent on the TCP/IP network 14. Such message will be received by the SNMP appliance 42 as having been "tickled". If such message does not appear, or it appears and identifies a different network appliance, then the system administrator will be alerted to a probable wiring error.

Many commercial network devices provide a contact or logic-level input port that can be usurped for the "tickle" signal. Cisco Systems routers, for example, provide an input that can be supported in software to issue the necessary message and identifier to the system administrator. A device interrupt has been described here because it demands immediate system attention, but a polled input port could also be used.

A network appliance 38, 40, 42, 44, that needs to have its power cycled on/off may need such action to clear a software lockup that has occurred. A power-on reset is needed to get the appliance to reboot. In such instances, a "tickle" signal from an IPM would be ignored because the recipient is essentially dead. Some systems may be temporarily awakened from their death sleep by a non-maskable interrupt and interrupt service routine. There may be enough resources to issue the message and identification that the system administrator needs to see. It will therefore be best for routine checks to be made before there is any trouble to register which IPM 30, 32, 34, 36, matches which network appliance 38, 40, 42, 44.

If the devices being supplied operating power by the IPM's 30, 32, 34, 36, are NT-servers, then an RS-232 serial interface is present that can be used for the "tickle" signal. In particular, the request-to-send (RTS) control line can be provided with a pulled-up dry-contact or open-collector from the IPM's 30, 32, 34, 36. A application program interface (API) is then added to the NT-server to issue the report message and identity when the RTS is toggled.

Figure 2:
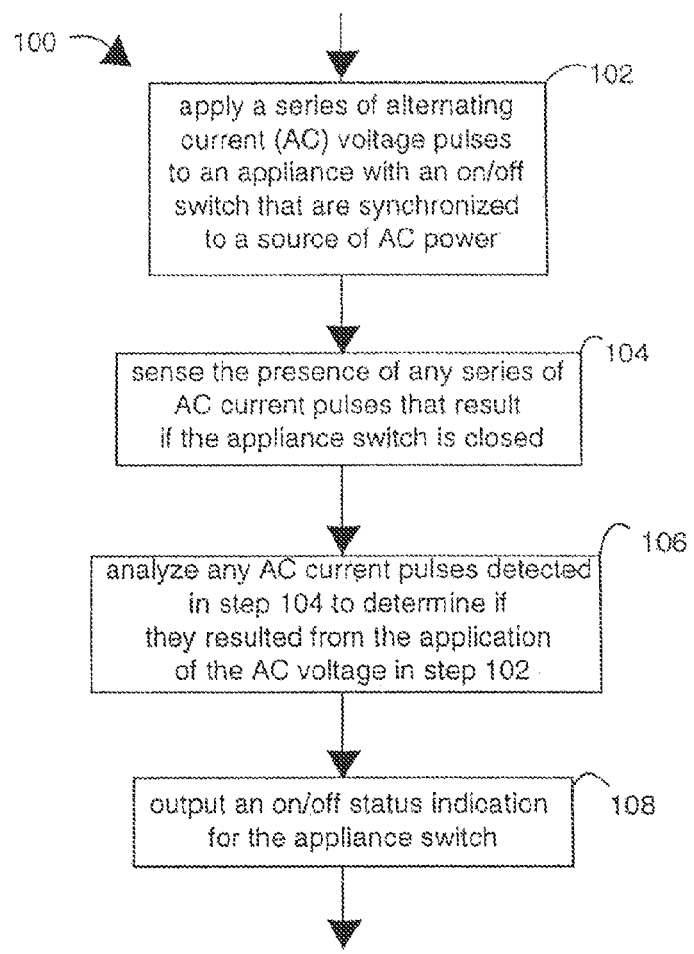
FIG. 2 is a flowchart of a method of appliance power switch status detection, according to the present invention.

FIG. 2 shows a method of appliance power switch status detection, referred to herein by the general reference numeral 100. The method 100 comprises a step 102 applying a series of alternating current (AC) voltage pulses to an appliance with an on/off switch that are synchronized to a source of AC power. A step 104 senses the presence of any series of AC current pulses that result if the appliance switch is closed. A step 106 analyzes any AC current pulses detected in step 104 to determine if they resulted from the application of the AC voltage in step 102. A step 108 outputs an on/off status indication for the appliance switch. Method 100 does not result in the turning-on and the operation of the appliance during steps 102 or 104, and is therefore unobtrusive.

Figure 3:
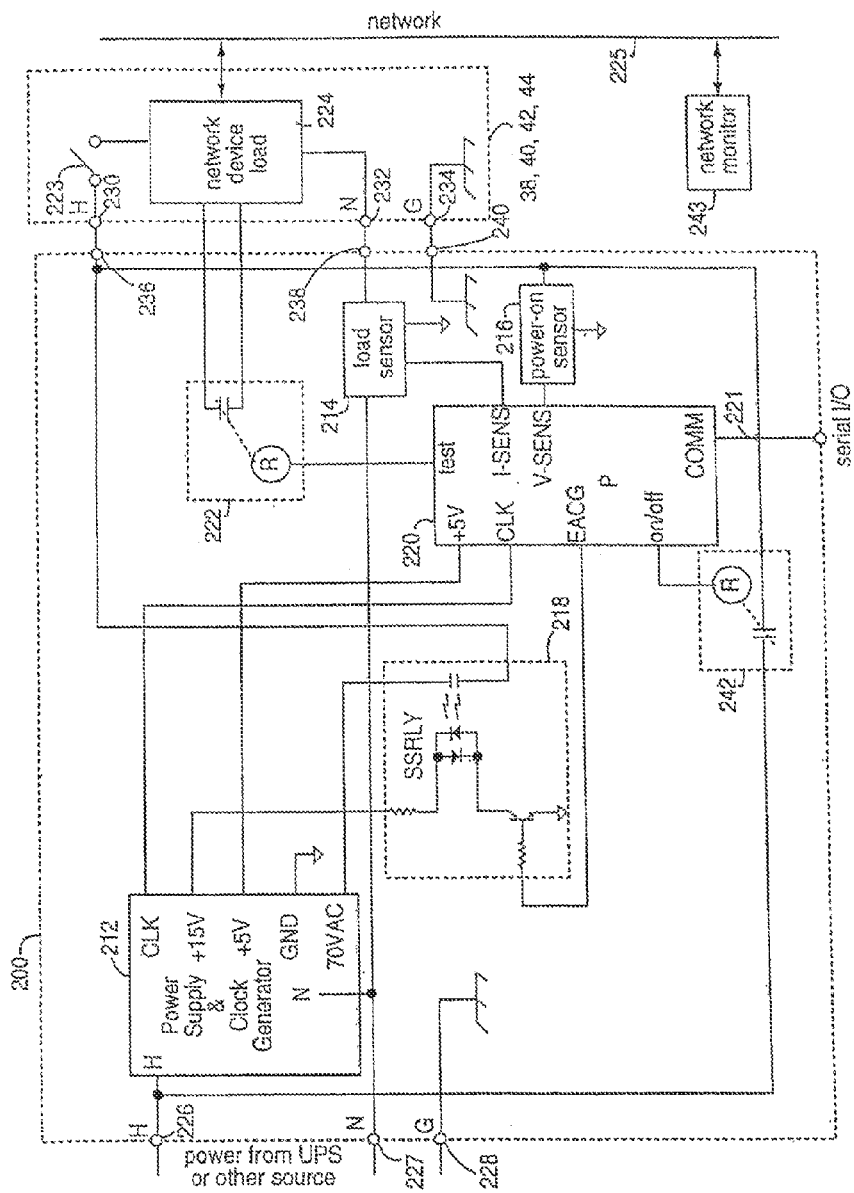
FIG. 3 is a schematic of a representative intelligent power module such as are included in the network of FIG. 1.

FIG. 3 illustrates an intelligent power module 200, similar to intelligent power modules 30, 32, 34, 36, which may be located external or internal to devices 38, 40, 42, 44, or internal or external to the UPS 26. The intelligent power module 200 includes a power supply and clock generator 212, a load sensor 214, a power-on sensor 216, a solid-state relay 218 and a microprocessor 220. A serial input/output (I/O) connection 221 provides for communication with a controller, e.g., power manager 28.

A "tickle" relay 222 is controlled by the microprocessor 220 and can issue a dry-contact test signal. Such signal is intended to stimulate a message and identity report to a system administrator. Preferably, the operating power is controlled by an IPM and such test signal or "tickle" are wired to the same network appliance.

An appliance, such as the network appliances 38, 40, 42, 44, has a power on/off switch 223 that may be internal or external to the appliance, and is represented in FIG. 3 by a network device load 224 connected to a network 225. The switch 223 may also actually comprise both internal and external switches in series. The incoming alternating current (AC) line power is applied to the intelligent power module 200 at a hot (H) terminal 226, a neutral (N) terminal 227 and a ground (G) terminal 228. The appliance has its incoming AC line power applied to a hot (H) terminal 230, a neutral (N) terminal 232 and a ground (G) terminal 234, which are respectively connected to a hot (H) terminal 236, a neutral (N) terminal 238 and a ground (G) terminal 240. A relay 242 allows automatic remote control by the microprocessor of power to the appliance due to its position in the incoming AC line.

A network monitor 243 and a system administrator are able to receive message and identity reports issued by the network device load 224 in response to a "tickle" signal.

The load sensor 214 is such that if a current is flowing because switch 223 is closed, the microprocessor will receive a logic low status indication.

Figure 4:
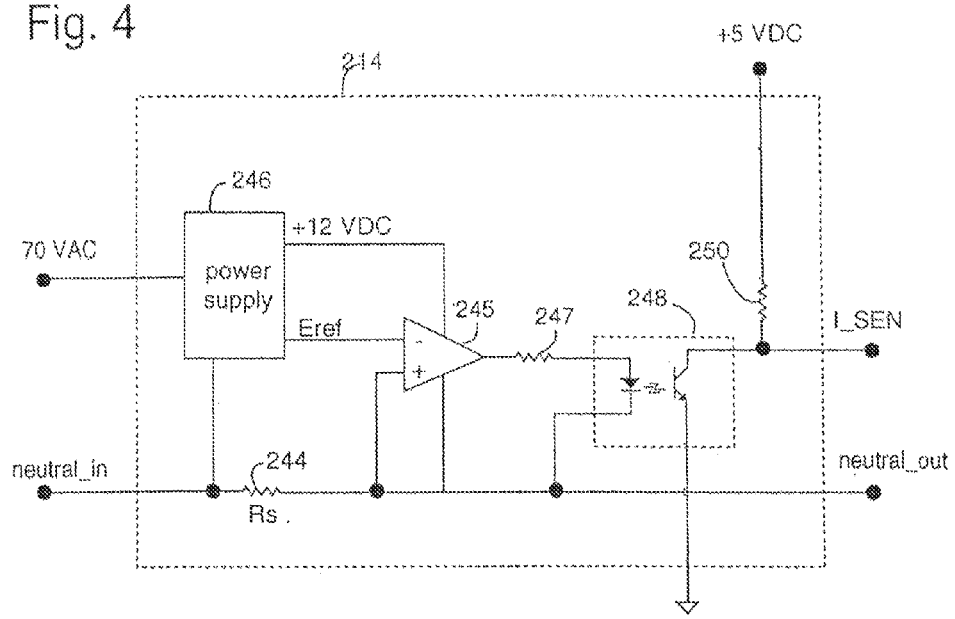
FIG. 4 is a schematic diagram of thee load sensor included in the intelligent power module of FIG. 3.

FIG. 4 represents an embodiment of the load sensor 214 included in FIG. 3. The load sensor 214 comprises a sense resistor 244 connected to a voltage comparator 245. When the voltage dropped across the sense resistor 244 exceeds a reference voltage provided by a power supply 246, the output of the voltage comparator 245 goes high. A resistor 247 couples this to an opto-isolator 248 and produces a five volt digital output (I_SENS) that indicates load/no-load to the microprocessor 220. A resistor 250 provides a pull-up to a current sense input to the microprocessor 220.

Figure 5:
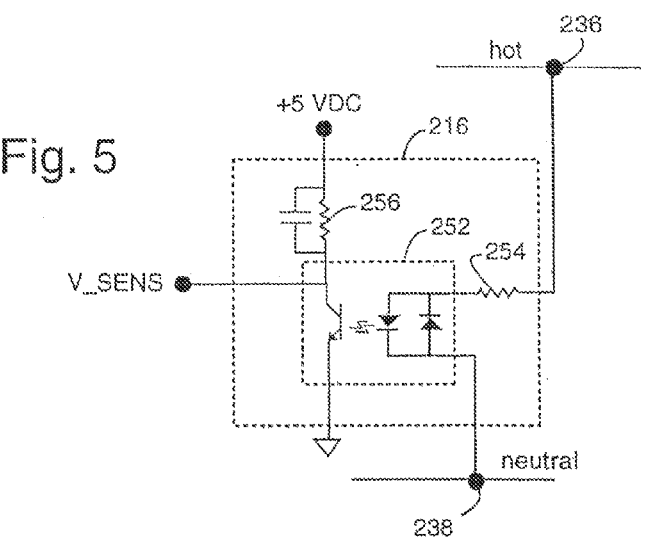
FIG. 5 is a schematic diagram of the power-on sensor included in the intelligent power module of FIG. 3.

FIG. 5 represents an embodiment of the power-on sensor 216 included in FIG. 3. The power-on sensor 216 includes an opto-isolator 252. The output of the ipto-isolator 252 goes low when a sufficient voltage is dropped across a resistor 254. A five volt power supply connection and a pull-up 256 provide a five volt logic output (V_SENS) that indicates power/no-power to the microprocessor 220.

In operation, the device 200 senses if switch 223 is closed or open by converting AC current pulses from the power supply 212 that flow through the series circuit comprising the solid-state relay 218, the H-terminals 230 and 236, the switch 223, the network device load 224, the N-terminals 232 and 238, the load sensor 214, and return to the power supply 212. If the switch 223 is open, no such current can flow.

The power supply and clock generator 212 provides a five volt pulse clock (CLK) to the microprocessor 220 at each zero-crossing of the incoming AC power line voltage across the H-terminal 226 and the N-terminal 227. A slightly delayed version of the clock is output by the microprocessor 220 to control the solid-state relay 218. A seventy volt AC output (70VAC) of the power supply and clock generator 212 provides a reduced voltage AC sine wave that is approximately seventy volts RMS. The solid-state relay 218 therefore gates through the seventy volt AC waveform twice each cycle such that alternating pulses of +70 volts and −70 volts are sent through switch 223 and load sensor 214. If a current flows because the switch 223 is closed, a characteristic pulse synchronized to the CLK signal will appear as an output from the opto-isolator 248. A resistor 250 provides a pull-up to a current sense input to the microprocessor 220. If the switch 223 is open, the characteristic pulses will not appear. An "on-sense" opto-isolator 252 provides isolation for a voltage sense input to the microprocessor 220.

The microprocessor 220 analyzes and stores its determination of whether the power is applied to the device 38-44 and whether the switch 223 is closed. Such data is thereafter useful to control the relay 242. The microprocessor 220 is programmed to control the relay 242 and to report the presence of current and voltage to the appliance through serial communication conducted over the serial I/O connection 221.

The power manager 28 is able to read from the intelligent power modules 30, 32, 34, 36, whether there is a proper operating voltage being supplied to the network appliances 38, 40, 42, 44, and whether such loads are turned on. The power manager 28 and its SNMP agent 46 are able to report such status in response to the GET command 48. The GET command modifies a MIB variable that is reported by the SNMP agent 46 to the SNMP manager 20.

The power manager 28 is able to require the intelligent power modules 30, 32, 34, 36, to turn the power being supplied to the network appliances 38, 40, 42, 44, on or off in response to the SET command 50. Such SET commands modify the MIB variable defined for power on/off, and allow independent power-cycling of each and any of the network appliances 38, 40, 42, 44. Such power cycling promotes a power-up reset of the appliance, e.g., when the SNMP agent 22 has reported a failure of the POP node 16 to the SNMP manager 20.

SNMP defines a client/server relationship. The client program, network manager 20, makes virtual connections to the server program, the SNMP agent 22 and 24 on a remote network device. The database controlled by the SNMP agent is the management information base (MIB). The MIB is a standard set of statistical and control values that provides information about the attributes of devices attached to the network. SNMP allows for the extension of these standard values with values that are specific to a particular SNMP agent through the use of private MIBs. The use of private MIB variables allows SNMP agents to be modified for a variety of devices, e.g., bridges, hubs, routers and CSU/DSUs, etc. SNMP operates by exchanging network information through protocol data unit (PDU) messages. PDUs carry variables that have both titles and values. There are five types of PDUs that SNMP uses to monitor a network, two for reading terminal data, two for setting terminal data, and one, the trap, monitoring network events. Every SNMP message consists of a variable, and every variable consists of a variable title, the integer, string data type of the variable, whether the variable is read-only or read-write, and the value of the variable.

The SNMP manager 20 collects information via MIBs about routers, hubs, bridges, concentrators, servers, switches and other network appliances. When a problem at a remote node is detected, the corresponding SNMP agent issues an alarm that identifies the problem by type and node address. The SNMP manager typically sends a Telnet script to a TCP/IP-addressable enterprise power manager. The Telnet script instructs the enterprise power manager to cycle the power cycle, to recover an otherwise locked-up network device. SNMP management is not required for the enterprise power manger and the associated intelligent power modules. The intelligent power modules include normally closed relays so power is always on except when the relay is deliberately opened to trigger a power on reset and reboot. The network management application monitors the UPS and the network appliances.

The load sensor and power-on sensor can be combined such that a console operator can determine if electrical power is available to an equipment rack and to an individual network appliance. A relay set located between the power source and the client equipment node supports an SNMP-type SET command that can be defined to open and close a relay to power-cycle the network appliance. Such power-cycling an clear a lockup condition and allow the device to return to normal operation via its own internal power-up reset mechanism.

A console operator can be notified by conventional means that a router is failing. A determination then needs to be made that the electrical power is available to the equipment rack and to an individual network appliance. The next action would be to try to power-cycle an individual network appliance to return it to operational status.

A power-on sensor 216, a load sensor 214 and a relay reset 218 can be combined in the electrical power supply connected to the equipment rack. Once a console operator has determined both that the router is failing and that the electrical power is available to the equipment rack and to the individual network appliance, the next logical step can be to power-cycle the individual network appliance, e.g., to return it to operational status.

Where the in-place equipment that supplies electrical power for an equipment rack cannot be modified to incorporate the functions of an intelligent power module, the intelligent power module 200 can be connected in-line between the electrical power source and the equipment power receptacle. The intelligent power module provides the necessary power-on sensor, load sensor, and relay reset circuit functions. The network management console operator can determine by conventional means that a device such as a router is failing. With the present invention it can be further determined that electrical power is available to an equipment rack and to an individual network appliance, and even that the device's power switch is on. The present invention further permits an action to power-cycle the individual network appliance, to return it to operational status by forcing a reboot.

A pass-through communication switch is preferably included with power manager 28 that is installed in the same equipment rack with other network appliances because many network appliances have RS-232 network management system ports. Such management ports are intended to permit users to upload new software and to update and inspect configuration tables. A call-pass-through multi-port communications switch allows the initial communications session with modem RS-232 or TCP/IP to be switched directly to a device's management port. For example, when a communications session is established to reboot a locked up router, after the router is back in operation, the same communications session can be transferred from the power manager 28 to the router's management port. Preferably, such transfer of the particular communications session can be switched directly from a user interface screen in communication with the SNMP agent 46. The network operator can thereafter continue the repair operation by inspecting or updating the router's configuration table, and to verify its operability.

User interfaces are preferably provided to be configured by a system administrator at the SNMP manager 20. A screen interface allows an operator to control individual intelligent power modules 30, 32, 34, 36, directly from an associated keyboard. A command interface preferably allows script files to be constructed and sent directly for execution. Response codes are returned after each command is executed. Group names are preferably supported which allows a single command to control multiple devices.

The power manager 28 preferably supports a variety of communication interfaces, such as, RS-232 and ETHERNET. Out-of-band communications are connectable through an RS-232 interface using a DB9-type connector on a back panel. Such a port is used to establish communications sessions. An external dial-in-modem can also be used to establish communications. In-band communications are preferably provided with a LAN communications interface that supports ETHERNET connections, e-g., 10BaseT or 10Base2, with both IPX and TCP/IP protocols being supported.

A seven layer network communications model that is universally used to communicate between most types of computer networks is defined by the International Organization of Standards (ISO). Every layer relies on all its lower layers to complete its communication tasks. There are seven layers identified as the application, presentation, session, transport, network, data link, and physical layers. For example, e-mail is a task of the application layer. The application layer uses all of the layers below it to deliver particular e-mail messages to their destinations. The presentation layer formats the look of the e-mail, and the physical layer actually transports the binary data across the network. For more information, see, Naugle, Matthew G., Local Area Networking, (McGraw-Hill: New York), 1991.

The information that the SNMP manager 20 can gather from the SNMP agents 22 and 24 around a network is the definition of the MIB and it has a hierarchical tree structure. At the top of the tree is the general network information. Each branch of the tree gets more detailed about a specific network area. The leaves of the tree include the most detail. A device may be a parent in the tree, and its children can be discrete serial and parallel devices. Each node in the MIB tree can be represented by a variable. The top of a local area network MIB tree is usually referred to as "internee".

Managed objects are accessed via the MIB and are defined using a subset of ASN.1. Each object type is named by an object identifier, which is an administratively assigned name. The object type and an object instance uniquely identify a specific object. Descriptor text strings are used to refer to the object type.

Network information is exchanged with protocol data unit (PDU) messages, which are objects that contain variables and have both titles and values. SNMP uses five types of PDUs to monitor a network. Two deal with reading terminal data, two deal with setting terminal data, and one, the trap, is used for monitoring network events such as terminal start-ups or shutdowns. When a user wants to see if a terminal is attached to the network, for example, SNMP is used to send out a read PDU to that terminal. If the terminal is attached, the user receives back a PDU with a value "yes, the terminal is attached". If the terminal was shut off, the user would receive a packet informing them of the shutdown with a trap PDU.

In alternative embodiments of the present invention, it may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A remotely manageable power distribution unit comprising in combination:
   A. a power strip housing;
   B. a power input disposed in the power strip housing;
   C. a first plurality of power outputs disposed in the power strip housing, each of the first plurality of power outputs being connectable to one of more electrical loads external to the power strip housing and to the power input;
   D. a power control section disposed with the power strip housing and being connectable in network communication through TCP/IP with a remote power control system and in power controlling communication with one of more of the power outputs among the first plurality of power outputs;
   E. an intelligent power module within the power control section, and being connectable in power communication with one of a plurality of external electrical appliances mounted in an electrical equipment rack; and
   F. a tickle issuance circuit disposed with the power strip housing and being connectable in communication with the remote power control system and in communication with at least one of the external electrical appliances, the tickle issuance circuit operative to:
      i) issue an appliance identity testing signal to any of the plurality of external electrical appliances,
      ii) issue a power-related command to the intelligent power module, and
      iii) send a message identifying a respective one or more of the external electrical appliances that has been tickled to a network monitor and a system administrator of the remote power control system.

2. The remotely manageable power distribution unit of claim 1, wherein the power control section comprises one of a power-on sensing circuit, a load sensing circuit, and a power off circuit.

3. The remotely manageable power distribution unit of claim 1, wherein the power control section comprises two of a power-on sensing circuit, a load sensing circuit, and a power off circuit.

4. The remotely manageable power distribution unit of claim 1, wherein the power control section comprises a power-on sensing circuit, a load sensing circuit, and a power off circuit.

5. The remotely manageable power distribution unit of claim 1, wherein the power strip housing is mounted in an electrical equipment rack.

6. Amended) A method of remotely managing power distribution unit, the method comprising in combination:
   A. providing a power strip housing;
   B. providing a power input disposed in the power strip housing;
   C. providing a first plurality of power outputs disposed in the power strip housing, each of the first plurality of power outputs being connectable to one of more electrical loads external to the power strip housing and to the power input;
   D. providing a power control section disposed with the power strip housing in network communication through TCP/IP with a remote power control system and in power controlling communication with one of more of the power outputs among the first plurality of power outputs;
   E. providing an intelligent power module within the power control section, and in power communication with one of a plurality of external electrical appliances mounted in an electrical equipment rack; and
   F. providing a tickle issuance circuit disposed with the power strip housing in communication with the remote power control system and in communication with at least one of the external electrical appliances; and
   with the tickle issuance circuit:
      i) issuing an appliance identity testing signal to any of the plurality of external electrical appliances,
      ii) issuing a power-related command to the intelligent power module, and
      iii) sending a message identifying a respective one or more of the external electrical appliances that has been tickled to a network monitor and a system administrator of the remote power control system.

7. The method of claim 6, also comprising, with the power distribution unit, sensing power information status of at least one of the external electrical appliances, wherein the power information status comprises at least one of a power-on status and a load status.

8. The method of claim 7, further comprising communicating the power information status to a remote network manager through an IP connection.

9. The method of claim 6, further comprising, in response to issuing the appliance identity testing signal, sending an identity report to a network monitor, the identity report comprising information identifying the one or more among the external electrical appliances.

10. The method of claim 6, further comprising, in response to issuing the appliance identity testing signal, sending an identity report to a network monitor, the identity report comprising information identifying the one or more among the external electrical appliances.

11. The method of claim 6, also comprising, with the power distribution unit, controlling the supply of power to the one or more among the external electrical appliances.

12. The method of claim 6, further comprising, upon receiving an external appliance identity response to the appliance identity testing signal, issuing a power-related command with respect to one of the one or more among the external electrical appliances, wherein the power-related command comprises one of a power on command, a power off command, and a power cycle command.

13. The method of claim 12, wherein the step of issuing a power-related command comprises issuing the power-related command to the intelligent power module, wherein the intelligent power module is in operating power communication with one of the one or more among the external electrical appliances.

* * * * *

UNITED STATES PATENT AND TRADEMARK OFFICE
CERTIFICATE OF CORRECTION

PATENT NO. : 8,527,619 B2
APPLICATION NO. : 12/963538
DATED : September 3, 2013
INVENTOR(S) : Carrel W. Ewing et al.

It is certified that error appears in the above-identified patent and that said Letters Patent is hereby corrected as shown below:

On the Title Page, Item (56)

On page 2, in column 1, under "Other Publications", line 4, delete "Uninteruptible" and insert -- Uninterruptible --, therefor.

On page 2, in column 2, under "Other Publications", line 35, delete "ActOffice".

In the Specification

In column 2, line 43, delete "noew" and insert -- new --, therefor.

In column 7, line 48, delete "ipto-isolator" and insert -- opto-isolator --, therefor.

In the Claims

In column 11, line 54, in claim 6, delete "Amended) A" and insert -- A --, therefor.

Signed and Sealed this
Sixth Day of May, 2014

Michelle K. Lee
*Deputy Director of the United States Patent and Trademark Office*